US008978881B2

(12) United States Patent
Prakasam et al.

(10) Patent No.: US 8,978,881 B2
(45) Date of Patent: Mar. 17, 2015

(54) PIVOT ROD AND METHOD OF MAKING THEREOF

(75) Inventors: Ramaswamy Prakasam, Coimbatore (IN); Sellappa Gounder Shanmugasundaram, Coimbatore (IN)

(73) Assignee: Habasit AG, Reinach (CH)

( * ) Notice: Subject to any disclaimer, the term of this patent is extended or adjusted under 35 U.S.C. 154(b) by 553 days.

(21) Appl. No.: 12/608,538

(22) Filed: Oct. 29, 2009

(65) Prior Publication Data

US 2011/0100784 A1 May 5, 2011

(51) Int. Cl.
 B65G 17/06 (2006.01)
 B65G 17/08 (2006.01)

(52) U.S. Cl.
 CPC ............ *B65G 17/08* (2013.01); *B65G 2207/12* (2013.01); *B65G 2207/30* (2013.01)
 USPC ........................................... 198/853; 198/851

(58) Field of Classification Search
 USPC ............................. 198/844.1, 844.2, 851, 853
 See application file for complete search history.

(56) References Cited

U.S. PATENT DOCUMENTS

| 4,682,687 | A | | 7/1987 | Leege et al. | |
|---|---|---|---|---|---|
| 4,934,518 | A | * | 6/1990 | Lapeyre | ........................ 198/853 |
| 5,129,688 | A | | 7/1992 | McGarvey | |
| 5,531,712 | A | | 7/1996 | Malcolm et al. | |
| 5,918,730 | A | * | 7/1999 | Wilcher | ........................ 198/851 |
| 6,029,802 | A | * | 2/2000 | Musiari et al. | ................. 198/852 |
| 6,195,868 | B1 | * | 3/2001 | Etherington et al. | ........ 29/522.1 |
| 7,108,127 | B2 | | 9/2006 | Krisl | |
| 7,168,557 | B2 | * | 1/2007 | Mitchell et al. | ................ 198/852 |
| 7,246,699 | B2 | * | 7/2007 | Frost et al. | ...................... 198/851 |
| 7,717,685 | B2 | * | 5/2010 | Moutafis et al. | ............... 417/547 |
| 7,784,890 | B1 | * | 8/2010 | Chen | ........................... 312/319.1 |
| 8,051,961 | B2 | * | 11/2011 | Azekatsu et al. | ............ 188/267.2 |
| 8,261,490 | B2 | * | 9/2012 | Flannery et al. | ................... 49/55 |
| 8,495,924 | B2 | * | 7/2013 | Fukano et al. | ................ 74/89.23 |
| 8,561,349 | B2 | * | 10/2013 | Flannery et al. | ................... 49/55 |

FOREIGN PATENT DOCUMENTS

| CA | 2621300 | 8/2009 |
|---|---|---|
| EP | 0860643 A2 | 8/1998 |
| FR | 2406210 A1 | 10/1977 |
| WO | 93/19464 A1 | 9/1993 |
| WO | 2007/138565 A2 | 12/2007 |
| WO | 2008/054397 A1 | 5/2008 |

* cited by examiner

*Primary Examiner* — Joseph Dillon, Jr.
(74) *Attorney, Agent, or Firm* — Hodgson Russ LLP

(57) ABSTRACT

A pivot rod that is formed by overmolding the end of a grooved rod with a plastic head. The pivot rod may be formed out of shear resistant materials such as steel or the like. Alternatively, a headed rod may be formed by overmolding a highly shear resistant, reinforced extruded plastic rod with a plastic ring or head of a moldable compound.

7 Claims, 4 Drawing Sheets

PIVOT ROD AND METHOD OF MAKING THEREOF

FIELD OF THE INVENTION

This invention relates to conveyor belts and, more particularly, to modular plastic conveyor belts formed of rows of plastic belt modules pivotally interlinked by transverse pivot rods.

BACKGROUND OF INVENTION

Because they are lightweight, do not corrode, and are easy to clean, unlike metal conveyor belts, plastic conveyor belts are used widely. Modular plastic conveyor belts are made up of molded plastic modular links, or belt modules, that can be arranged side-by-side in rows of selectable width. A series of spaced apart link ends extending from each side of the modules include aligned apertures or slots to accommodate a pivot rod. The link ends along one end of a row of modules are interconnected with the link ends of an adjacent row. A pivot rod journaled in the aligned apertures of the side-by-side and end-to-end connected modules forms a hinge between adjacent rows. Rows of belt modules are connected together to form an endless conveyor belt capable of articulating about a drive sprocket.

Headed pivot rods may be used for joining belt modules. There are many versions available in the market including snap-fit retaining versions such as shown in U.S. Pat. Nos. 5,181,601 and 5,645,160, which are incorporated herein by reference. Another system is the Habasit Smart Fit system as disclosed in U.S. Pat. No. 7,108,127, which is also incorporated herein by reference. The pivot rods are typically manufactured from plastic that is molded or extruded with thermoformed heads and/or retaining rings integrally formed thereon. These rod heads and retaining rings function well for rod retaining and provide for ease of assembly and disassembly. These systems work well for all applications where the loads on the belts are moderate. For conveyors where very high loads need to be conveyed, "heavy duty" plastic belts with pivot rods of 10 mm diameter or greater are typically used. The modules for heavy duty belts may reach a thickness of one inch or more. Typically in the automotive and paper (paper roll handling) industries, loads may reach a very high level where plastic pivot rods are not strong enough. To achieve the necessary strength, steel chains may be used instead of plastic chains. However, thick plastic modules are preferred since they need no lubrication and run more quietly and smoothly. In most of those cases the weak point is the shearing strength and elasticity of the plastic pivot rod. This problem may be solved by using steel rods to join the heavy duty plastic modules. Although it is possible to form the retaining ring on the steel rod directly, the process is expensive and inefficient. Accordingly, what is needed is an improved high strength pivot rod for use with heavy duty plastic modules.

SUMMARY OF INVENTION

The present invention meets the above-described need by providing a pivot rod that is formed by overmolding the end of a grooved rod with a plastic head. The pivot rod may be formed out of shear resistant materials such as steel or the like. Alternatively, a headed rod may be formed by overmolding a highly shear resistant, reinforced extruded plastic rod with a plastic ring or head of a moldable compound.

BRIEF DESCRIPTION OF THE DRAWING FIGURES

The invention is illustrated in the drawings in which like reference characters designate the same or similar parts throughout the figures of which:

FIG. 3b is another elevational view of the overmolded rod shown in FIG. 3a;

FIG. 4b is another elevational view of the rod of FIG. 4a;

DETAILED DESCRIPTION OF THE INVENTION

Figure 1:
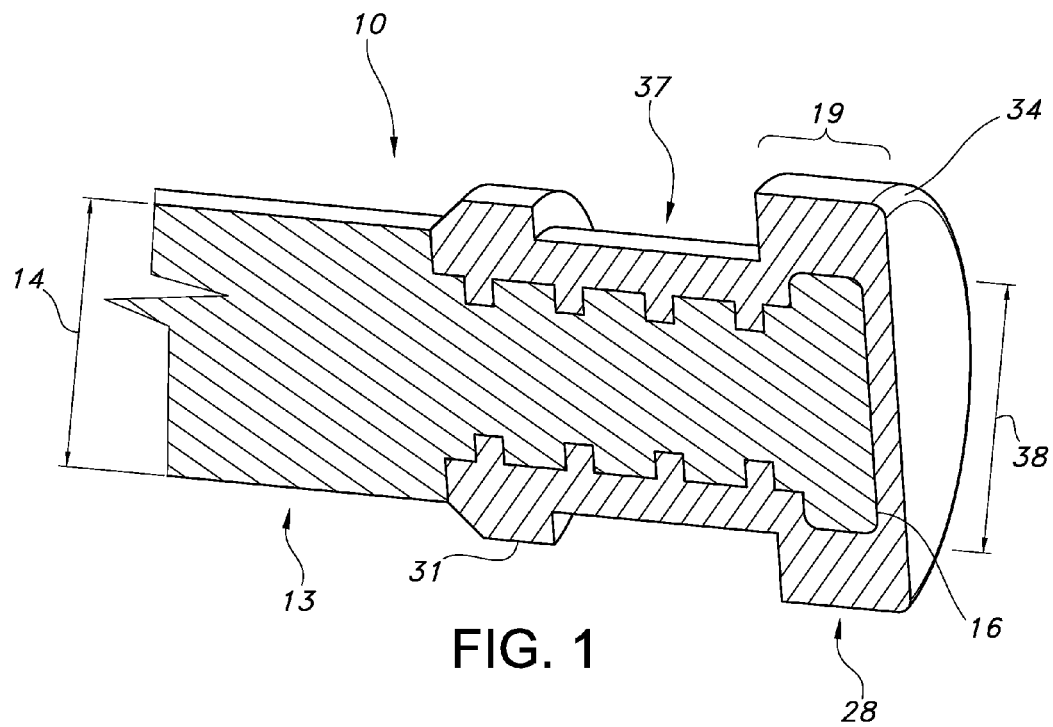
FIG. 1 is a cutaway perspective view of an overmolded rod of the present invention.
Figure 3A:
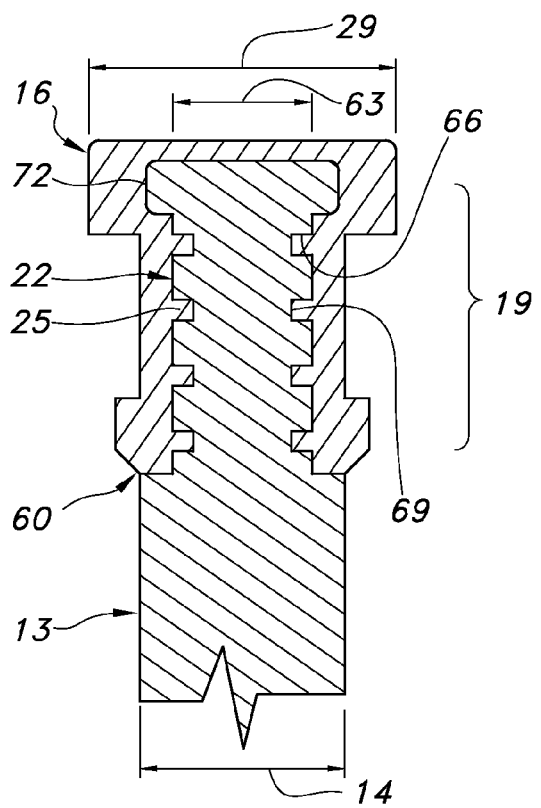
FIG. 3a is an elevational view of a first embodiment of the overmolded rod.

Turning to FIG. 1, a pivot rod 10 may be constructed of a high strength material such as steel. Alternatively, a highly shear resistant, reinforced plastic rod may be used. Other materials with high shear strength and low elasticity such as composites or the like may also be suitable. A middle portion 13 of the rod 10 has a substantially constant diameter 14. As best shown in FIG. 3a, the end portion 16 of the rod 10 has a profile 19 that is different than the middle portion 13. The end portion 16 includes reduced diameter portions 22 and grooves 25 integrally formed in the rod. As shown, a cap 28 (FIG. 3b) is molded onto the end of the rod. The cap 28 includes a retaining ring 31 and a head 34 which are shown in outline in FIG. 3a. The retaining ring 31 is used for snap rod retaining systems as will be evident to those of ordinary skill in the art based on this disclosure. The cap 28 includes a portion 37 between the ring 31 and the head 34. The portion 37 has a diameter 38 that is approximately equal to the diameter 14 of the rod. The cap 28 is molded onto the end of the rod 10. The plastic molding process will be evident to those of ordinary skill based on this disclosure.

Figure 2:
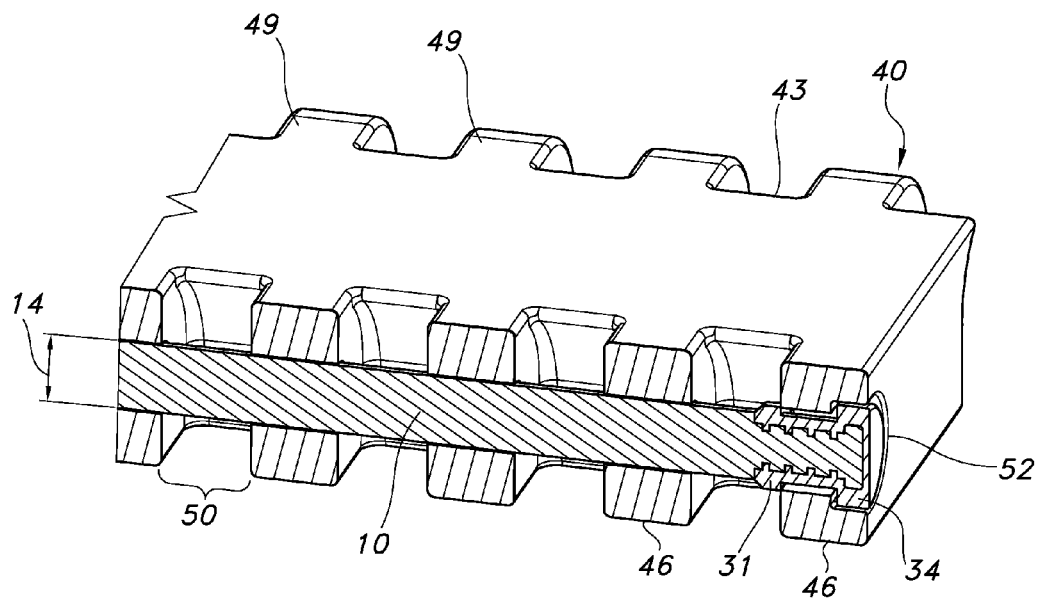
FIG. 2 is a cutaway perspective view of a belt module containing the overmolded rod of the present invention.

In FIG. 2, the rod 10 of the present invention is shown in position in a belt module 40. The adjacent belt module has been removed for clarity. The belt module 40 has an intermediate section 43 with a first plurality of link ends 46 extending from the intermediate section 43 in a first direction and a second plurality of link ends 49 extending from the intermediate section 43 in a second direction. The first link ends 46 and the second link ends 49 are offset from each other and have spaces 50 defined between successive link ends. As a result, the first plurality of link ends 46 of a first module 40 fit into the spaces 50 between the second plurality of link ends 49 of an adjacent module 40. The link ends 46, 49 have transverse pivot rod openings 52. The pivot rod openings 52 in the respective link ends 46 and 49 are capable of aligning when the link ends 46, 49 are intercalated. The pivot rod 10 fits into the aligned pivot rod openings 52 to connect one row of modules 40 to an adjacent row. The modules 40 may be connected in bricklayed fashion and the adjacent rows of modules 40 form an endless belt that is capable of articulating about a sprocket (not shown). The retaining ring 31 provides for installation of the pivot rod 10 into the belt from one end and prevents the pivot rod 10 from sliding out of the belt after it is installed.

Figure 3B:
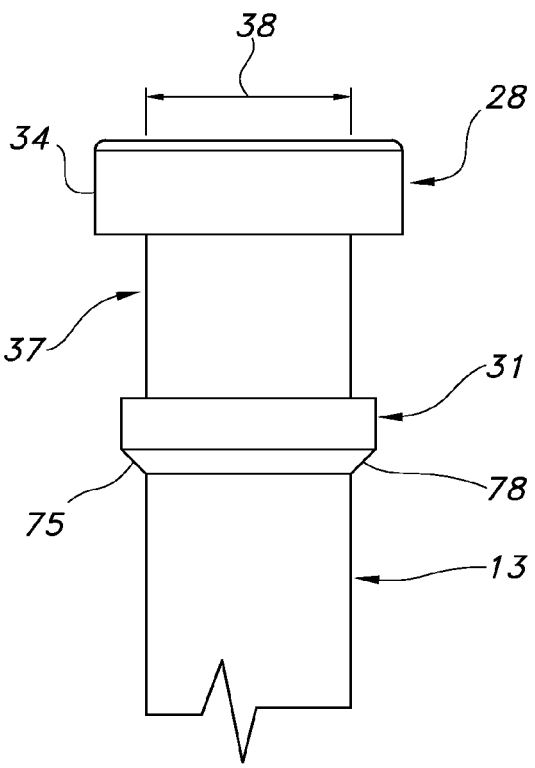

In FIGS. 3a and 3b, the embodiment shown in FIG. 1 is shown in greater detail. The pivot rod 10 has an approximately constant diameter 14 from the mid portion 13 of the rod 10 toward the end 16. At a point 60 spaced apart from the end 16, the diameter of the pivot rod 10 is stepped down to a second diameter 63 that is less than the diameter 14 of the midportion 13 of the rod 10. In the reduced second diameter 63 section, there are a plurality of grooves 25 defined therein. The grooves 25 shown in FIG. 3a are square however other shapes may also be suitable. The square grooves 25 have opposed side walls 66 and a bottom wall 69. The grooves 25 extend along the reduced diameter 63 from position 60 where the ring 31 is formed toward the end 16 of the rod 10 where the head 34 is located. The grooves 25 extend to a wider section 72 (FIG. 3a) located at the distal end 16 of the rod 10. The overmolded cap 28 includes the retaining ring 31 which has a diameter 29 wider than the diameter 14 of the rod 10. The leading edges 75, 78 of the retaining ring 31 may be angled to provide for easier insertion through the transverse pivot rod openings 52. Beyond the retaining ring 31, the cap 28 has a diameter 38 that is approximately equal to the diameter 14 of the pivot rod 10 in the midportion 13. The section 37 having the same diameter as the midportion 13 extends to the head 34 which has a larger diameter 29. When the pivot rod 10 is installed in a belt, the outermost link end fits between the retaining ring 31 and the head 34.

Figure 4A:
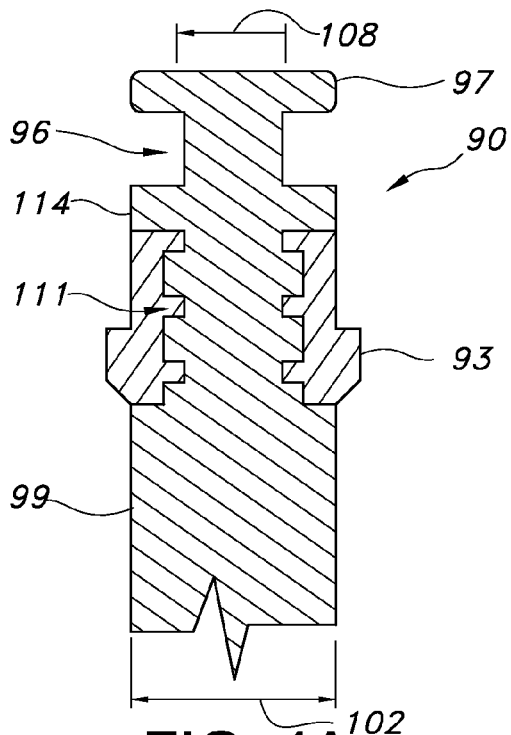
FIG. 4a is an elevational view of a second embodiment of the overmolded rod of the present invention.
Figure 4B:
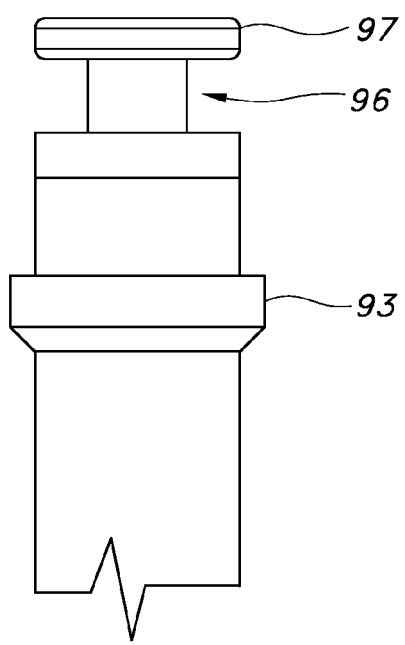

Turning to FIGS. 4a and 4b, the present invention may also be used to form a "headless" rod where the end of the rod 90 has the same diameter as the midportion. The pivot rod 90 shown in these figures includes a retaining ring 93 but does not include an oversized head at the distal end of the rod 90. The rod 90 has a groove 96 near the end 97 for rod extraction. Because the retaining ring 93 provides for rod retention, an oversized head is not required. As shown in FIG. 4a, the pivot rod 90 also has a midportion 99 with a first diameter 102. Toward the end 97 of the rod 90, the rod steps down to a second diameter 108 and a series of square grooves 111 are formed. The grooves 111 extend to a section 114 with a diameter 115 equal to the diameter 102 of the midportion 99. This section 114 is spaced apart from the distal end 97 of the rod 90 which also has a diameter equal to the diameter 102 of the midportion 99. The groove 96 near the end 97 provides a space for receiving a screw driver or the like for extracting the pivot rod 90 from a belt for disassembling the belt.

Figure 5A:
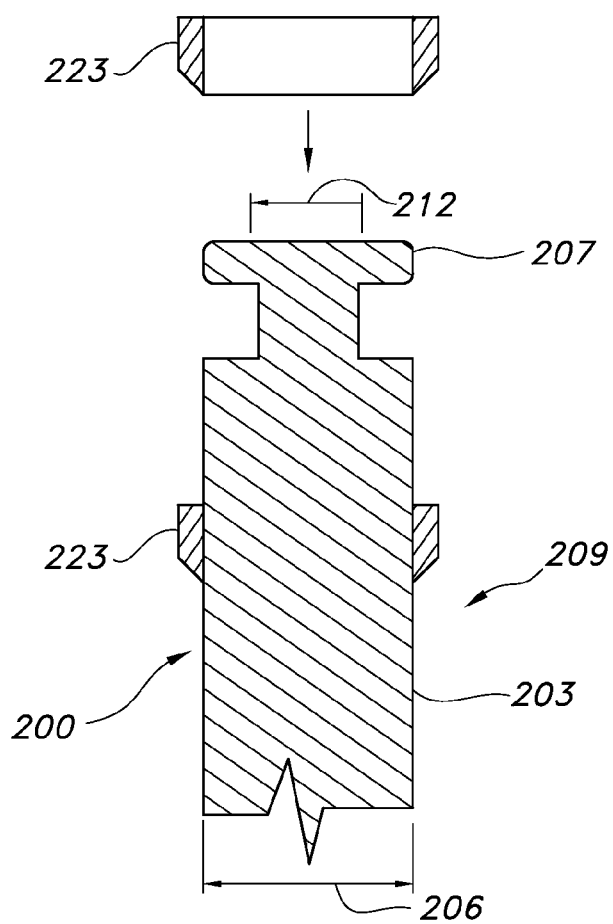
FIG. 5 is an elevational view of another embodiment of the invention.
Figure 5B:
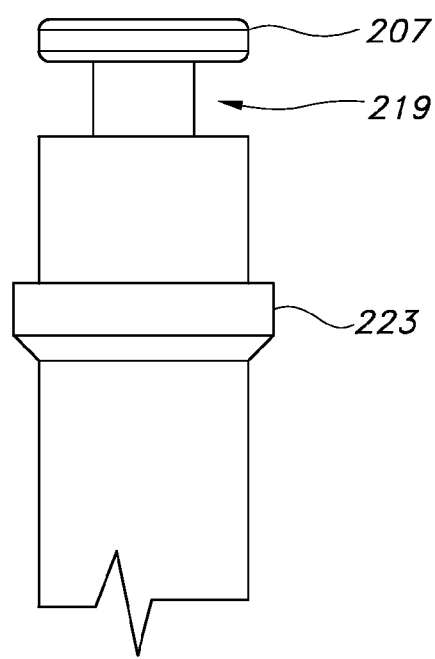

Turning to FIG. 5, an alternate embodiment of the invention includes a pivot rod 200 having smooth side walls 203 with a substantially constant diameter 206 through the middle portion 209. Toward the distal end 207, there is a reduced diameter 212. The distal end 207 has the same diameter 206 as the midportion 209 of the rod 200. The reduced diameter 212 provides a gap 219 that may be used for manual extraction of the pivot rod 200 for disassembling of the belt.

A retaining ring 223 is formed by heat shrinking a ring 223 onto the outside of the pivot rod 200 at a position spaced apart from the distal end 207 of the pivot rod. The ring 223 is formed of steel capable of heat shrinking. The rod 200 may also be constructed of steel and may be formed without grooves. The retaining ring 223 is installed by heating the ring 223, shifting it over the rod 200, and then cooling the metal ring 223 such that it contracts or shrinks around the pivot rod 200 to become firmly fixed to the rod 200.

Figure 6:
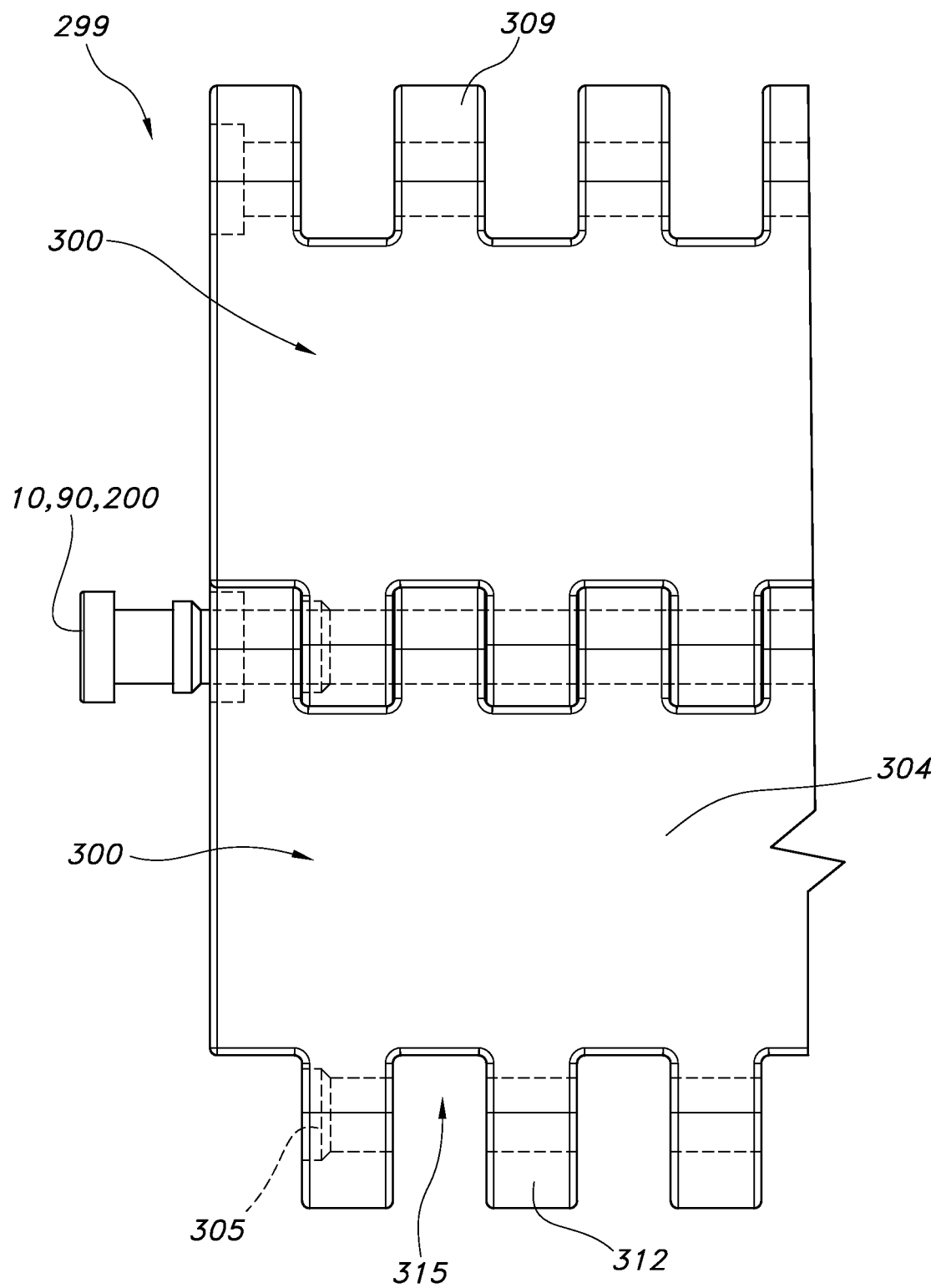
FIG. 6 is a plan view of a portion of a modular belt formed with pivot rods according to the present invention.

Turning to FIG. 6, a modular belt 299 is constructed with a plurality of modules 300. The modules have a plurality of first link ends 309 and a plurality of second link ends 312 extending in opposite directions from an intermediate section 304. The link ends 309, 312 are spaced apart and offset to form openings 315 such that the link ends 309 of an adjacent module 300 fit into the openings 315 between the link ends 312. The link ends 309, 312 have transverse pivot rod openings 305 that are capable of aligning to receive the pivot rod when the link ends of adjacent modules are intercalated. The pivot rods 10, 90, and 200 may be used to connect adjacent rows of modules 300 to form an endless belt capable of pivoting such that the belt can traverse a sprocket.

What is claimed is:

1. A pivot rod, comprising:
a body constructed of a first material, the body having a first section with a first diameter and having a second section with a second diameter smaller than the first diameter, the second section having a plurality of grooves defined therein; and,
a retaining ring member configured to prevent migration of the pivot rod when installed between belt modules, the retaining ring member formed from a second material that is weaker in strength than the first material, the retaining ring member molded onto the second section of the body, the retaining ring member including a retaining ring having a diameter that is larger than the first diameter.

2. The pivot rod of claim 1, wherein the first material is steel.

3. The pivot rod of claim 1, wherein the first material is a shear resistant plastic material.

4. The pivot rod of claim 1, wherein the first material is a high strength composite material.

5. The pivot rod of claim 1, wherein the retaining ring has an angled wall extending along a leading edge.

6. The pivot rod of claim 1, wherein the first material is steel and the second material is plastic.

7. A modular belt, comprising:
a plurality of modules having link ends with transverse pivot rod openings, the link ends being spaced apart and offset from one another such that the link ends of adjacent modules are capable of intercalating such that pivot rod openings align;
a plurality of pivot rods disposed through the aligned transverse pivot rod openings, the pivot rods having a body constructed of a first material, the body having a first section with a first diameter and having a second section with a second diameter smaller than the first diameter, the second section having a plurality of grooves defined therein; and, the pivot rods having a retaining ring member configured to prevent migration of the pivot rods from the plurality of modules, the retaining ring member formed from a second material that is weaker in strength than the first material, the retaining ring member molded onto the second section of the body, the retaining ring member including a retaining ring having a diameter that is larger than the first diameter.

* * * * *